(12) United States Patent
Fleckner et al.

(10) Patent No.: US 8,571,739 B2
(45) Date of Patent: Oct. 29, 2013

(54) DRIVE SYSTEM FOR A PLUG-IN HYBRID MOTOR VEHICLE

(75) Inventors: Marco Fleckner, Ludwigsburg (DE); Matthias Lederer, Renningen-Malmsheim (DE); Martin Roth, Rutesheim (DE); Andre Klick, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/536,134

(22) Filed: Jun. 28, 2012

(65) Prior Publication Data

US 2013/0006462 A1    Jan. 3, 2013

(30) Foreign Application Priority Data

Jun. 29, 2011 (DE) .................. 10 2011 051 439

(51) Int. Cl.
*B60L 9/00* (2006.01)

(52) U.S. Cl.
USPC ............................................. 701/22

(58) Field of Classification Search
None
See application file for complete search history.

(56) References Cited

U.S. PATENT DOCUMENTS

| | | | |
|---|---|---|---|
| 5,722,911 A | 3/1998 | Ibaraki et al. | |
| 6,480,767 B2 * | 11/2002 | Yamaguchi et al. | 701/22 |
| 6,637,530 B1 | 10/2003 | Endo et al. | |
| 6,886,648 B1 * | 5/2005 | Hata et al. | 180/65.235 |
| 7,900,726 B2 | 3/2011 | Kidston et al. | |
| 2002/0036120 A1 * | 3/2002 | Omote et al. | 184/6.12 |
| 2006/0017414 A1 * | 1/2006 | Joe et al. | 318/432 |
| 2007/0262749 A1 | 11/2007 | Luan et al. | |
| 2007/0275808 A1 * | 11/2007 | Iwanaka et al. | 475/5 |
| 2008/0029319 A1 * | 2/2008 | Fleckner et al. | 180/65.2 |
| 2009/0192660 A1 | 7/2009 | Tamor et al. | |
| 2009/0287366 A1 | 11/2009 | Davis et al. | |
| 2010/0106351 A1 | 4/2010 | Hanssen et al. | |

FOREIGN PATENT DOCUMENTS

| | | |
|---|---|---|
| DE | 102009004671 A1 | 9/2009 |
| GB | 2476107 A | 6/2011 |

* cited by examiner

*Primary Examiner* — Thomas Tarcza
*Assistant Examiner* — Adam Alharbi
(74) *Attorney, Agent, or Firm* — RatnerPrestia

(57) ABSTRACT

A drive system for a plug-in hybrid motor vehicle, having an internal combustion engine, an electric motor, a high-voltage source, in particular a high-voltage battery which has a minimum setpoint state of charge, a generator, a clutch, at least one transmission, at least one drive axle and a control unit, with the internal combustion engine being mechanically connected to at least one drive axle, with a first drive mode, "depleting mode", and a second drive mode, "sustaining mode", being provided in the control unit, with a third drive mode, "increasing mode", which can be manually activated being provided, said third drive mode providing a load point increase at the internal combustion engine in such a way that the high-voltage source can be charged during driving and therefore the first drive mode can be activated.

6 Claims, 1 Drawing Sheet

DRIVE SYSTEM FOR A PLUG-IN HYBRID MOTOR VEHICLE

CROSS-REFERENCE TO RELATED APPLICATIONS

This U.S. patent application claims priority to German Patent Application No. DE102011051439.2, filed Jun. 29, 2011, which is incorporated by reference herein in its entirety.

FIELD OF THE INVENTION

The invention relates to a drive system for a plug-in hybrid motor vehicle, having an internal combustion engine, an electric motor, a high-voltage source, in particular a high-voltage battery which has a minimum setpoint state of charge, a generator, a clutch, at least one transmission, at least one drive axle and a control unit, with the internal combustion engine being mechanically connected to at least one drive axle, with a first drive mode, "depleting mode", and a second drive mode, "sustaining mode", being provided in the control unit.

BACKGROUND

Drive systems of this kind have long been known. It should be noted that, instead of an internal combustion engine as a primary motor, a fuel cell can also generally serve as a primary motor. In particular, DE 10 2009 004 671 A1 describes a drive system of a plug-in hybrid motor vehicle. In this case, the control unit provides two drive modes, specifically the "depleting mode" or charge consumption mode, where electrical energy is discharged from the high-voltage source and used for driving purposes, and the "sustaining mode" or charge storage mode, in which the high-voltage battery is used only as a buffer storage means. The choice between the two modes is made essentially by the control unit. It goes without saying that once the minimum setpoint state of charge is reached and the control unit has selected the "sustaining mode", the "depleting mode" can no longer be used. This is disadvantageous particularly when driving in a "zero-emission zone". In this case, the high-voltage source of the motor vehicle first has to be fully recharged at a power outlet, so that the "depleting mode" is available.

SUMMARY

An object is therefore to provide a drive system for a plug-in hybrid motor vehicle which avoids the abovementioned disadvantages. A further object of the invention is to provide a method for operating a drive system of this kind.

These and other objects are achieved in that a third drive mode, "increasing mode", which can be manually activated, is provided, said third drive mode providing a load increase at the internal combustion engine in such a way that the high-voltage source can be charged during driving and therefore the first drive mode can be activated. As a result, it is possible to generate the electrical range for subsequent journeys. The availability of the first drive mode, "depleting mode", can also be re-established without charging at the power outlet. In some driving situations, it may be disadvantageous, against the background of a poor degree of efficiency, to increase the load point of the internal combustion engine. In order to prevent this, one advantageous further embodiment makes provision for it to be possible for the third drive mode to be activated only when the total degree of charging efficiency of the efficiency chain of the internal combustion engine, high-voltage source and electric motor is greater than a predefinable value, this value being approximately 30%. Furthermore, it may be advantageous to not perform charging exclusively in the "increasing mode" but rather to provide an automatic start/stop system for the internal combustion engine, with the limits (for example the desired drive power) for the start/stop operation of the internal combustion engine being coupled to the relationship between the setpoint state of charge and the actual state of charge of the energy storage means. The start/stop limits are reduced in the third mode, "increasing", in comparison to the second mode, "sustaining".

The further object is achieved by a method for operating a drive system of this kind, with the first drive mode being automatically activated when the high-voltage source is fully charged, and with the second drive mode being automatically activated when the minimum setpoint state of charge is reached, with the third drive mode being manually activated during the first drive mode or second drive mode in order to increase the load point of the internal combustion engine and to charge the high-voltage source. It is also advantageous when the second drive mode is activated during the first or third drive mode in order to use the high-voltage source as a buffer storage means, so that the state of charge is held at a constant level. As soon as the maximum state of charge is reached as a result of charging in the third mode, an automatic changeover is made to the second mode. Furthermore, the second drive mode can advantageously also be manually activated.

BRIEF DESCRIPTION OF THE DRAWINGS

An exemplary embodiment of the invention is illustrated in the drawing and will be described below.

In the drawings.

DETAILED DESCRIPTION

Figure 1:
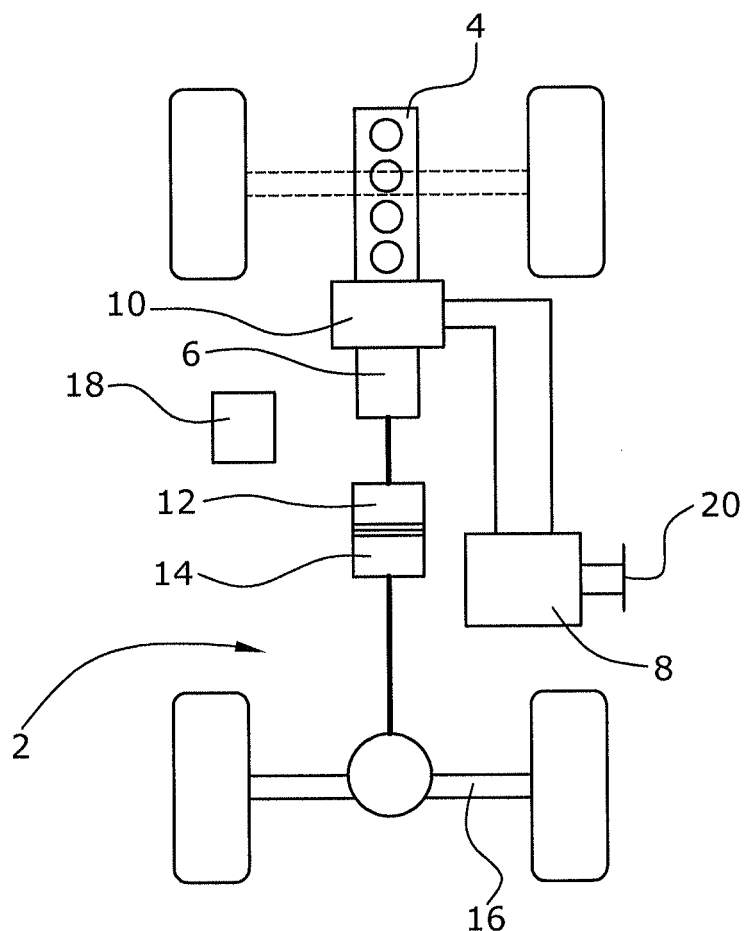
FIG. 1 shows a schematic illustration of a drive system according to aspects of the invention for a plug-in hybrid motor vehicle.

FIG. 1 shows, by way of example, a drive system 2 for a plug-in hybrid motor vehicle. The drive system 2 is in the form of a parallel hybrid drive in the present case. Said drive system has an internal combustion engine 4, an electric motor 6, a high-voltage source 8 which is designed as a high-voltage battery in the present case, a generator 10 and also a clutch 12 and a transmission 14. The internal combustion engine 4 and the electric motor 6 are both mechanically connected to a drive axle 16 via the transmission 14. The electric motor 6 and the internal combustion engine 4 can be used both individually and simultaneously to drive the vehicle. The electric motor 6 and the internal combustion engine 4 can be decoupled by means of the clutch 12, so that only the electric motor 6 acts on the drive axle 16 in a first drive mode, the "depleting mode". In the second drive mode, the "sustaining mode", the high-voltage battery 8 is used merely as a buffer storage means, so that the state of charge SoC is kept at a constant value.

A control unit 18 is provided in order to select a drive mode as a function of specific parameters, for example the state of charge of the high-voltage source 8, the required torque etc. The high-voltage battery 8 can be connected to an electrical charging station by means of a plug 20 in a known manner.

According to aspects of the invention, provision is then made for a further drive mode 26, "increasing mode", to be stored in the control unit 18, it being possible for said further drive mode to be manually activated. As a result, the load at the internal combustion engine 4 is increased in such a way that the high-voltage battery 8 is charged during driving and therefore the first drive mode 22 can be reactivated without the high-voltage battery 8 having to be connected to an external charging station by means of the charging plug 20.

Figure 2:
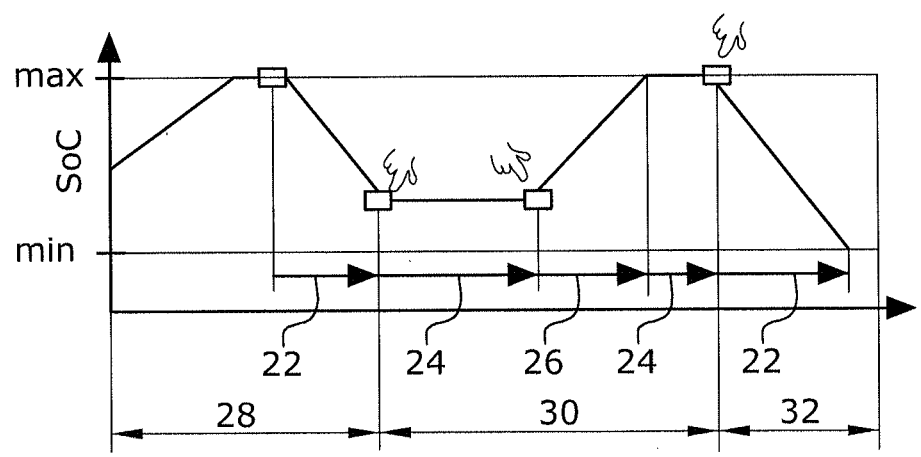
FIG. 2 shows an exemplary profile of the state of charge of the high-voltage source as a function of a driving cycle.

FIG. 2 shows the state of charge of the high-voltage source 8 in relation to a driving cycle. At the beginning of the driving cycle, the high-voltage source 8 is fully charged. During city driving 28, the motor vehicle is operated in the first drive mode 22, the "depleting mode", by the control unit 18. Therefore, said motor vehicle is driven predominantly electrically. This is followed by a cross-country journey 30. The state of charge would be adequate to carry out part of the cross-country journey 30 in the first drive mode 22, but the driver recognizes that the range is too low and manually selects the second drive mode 24, "the sustaining mode", in which the high-voltage source 8 is used only as a buffer storage means. In this way, said buffer storage means can use the state of charge of the high-voltage source 8 to subsequently carry out further driving in the first drive mode 22. During the cross-country journey, the driver recognizes that he may require a fully charged electric motor 6 for a subsequent journey through a "zero-emission zone" 32. In order to increase the state of charge of the high-voltage source 8, said driver manually selects the third drive mode 26, the "increasing mode". The control unit 18 checks whether the degree of charging efficiency of the internal combustion engine 4, high-voltage source 8 and electric motor 6 is >30% and then actuates the third drive mode 26. If the above-described degree of charging efficiency is <30% and a procedure of this kind is accordingly inefficient, the motor vehicle is operated similarly to in the second drive mode. If during the cross-country journey 30, the high-voltage source 8 is fully charged, the control unit 18 automatically returns to the second drive mode 24. When it enters the zero-emission zone 32, the vehicle can then again be operated in the first drive mode 22, in the purely electric drive mode, free from emission values. On account of a drive strategy of this kind, the run time of the internal combustion engine 6 can be reduced in comparison to the second drive mode 24 by combining the first and third drive modes 22, 26. The average degree of efficiency of the internal combustion engine is also increased because all the phases in which only the consumption of the on-board electrical system is covered in the second drive mode 24 are replaced. The number of re-starts during start/stop operation can also be reduced, so that both the electrical starting energy and the additional fuel injection quantity for re-starting can be saved.

What is claimed is:

1. A drive system for a plug-in hybrid motor vehicle, having an internal combustion engine, an electric motor, a high-voltage source, comprising a high-voltage battery which has a minimum setpoint state of charge, a generator, a clutch, at least one transmission, at least one drive axle and a control unit, with the internal combustion engine being mechanically connected to at least one drive axle, with a first drive mode, "depleting mode", and a second drive mode, "sustaining mode", being provided in the control unit, wherein a third drive mode, "increasing mode", which can be manually activated is provided, said third drive mode providing a load point increase at the internal combustion engine in such a way that the high-voltage source can be charged during driving and therefore the first drive mode can be activated.

2. The drive system as claimed in claim 1, wherein the third drive mode can be activated only when the degree of efficiency of charging of the internal combustion engine, high-voltage source and electric motor is greater than or equal to a definable degree of efficiency.

3. The drive system as claimed in claim 1, wherein an automatic start/stop system is provided, with the limits for the start/stop operation of the internal combustion engine being coupled to the relationship between the setpoint state of charge and the actual state of charge of the energy storage means.

4. The drive system as claimed in claim 1, wherein the second drive mode can be manually activated.

5. A method for operating a drive system as claimed in claim 1, with the first drive mode being automatically activated when the high-voltage source is fully charged, and with the second drive mode being automatically activated when the minimum setpoint state of charge is reached, wherein the third drive mode is manually activated during the first or second drive mode in order to increase the load point of the internal combustion engine and to charge the high-voltage source.

6. The method for operating a drive system as claimed in claim 5, wherein the second drive mode is activated during the first or third drive mode in order to use the high-voltage source as a buffer storage means.

\* \* \* \* \*